United States Patent [19]

England

[11] Patent Number: 4,538,080
[45] Date of Patent: Aug. 27, 1985

[54] FLUX CONTOURED ROTARY ELECTROMAGNETIC MACHINE

[75] Inventor: Thomas R. England, Blacksburg, Va.

[73] Assignee: Kollmorgen Technologies, Corporation, Dallas, Tex.

[21] Appl. No.: 504,071

[22] Filed: Jun. 14, 1983

[51] Int. Cl.³ .............................................. H02K 21/28
[52] U.S. Cl. ..................................... 310/154; 310/181
[58] Field of Search ........................ 310/154, 181, 40; 322/94

[56] References Cited

U.S. PATENT DOCUMENTS

| 3,064,147 | 11/1962 | Porter et al. | 310/40 |
| 3,296,471 | 1/1967 | Cochhardt | 310/181 X |
| 4,088,943 | 5/1978 | Schmidt | 322/94 X |
| 4,091,300 | 5/1978 | Lynch et al. | 310/154 |
| 4,296,343 | 10/1981 | McMillen | 310/154 |
| 4,453,097 | 6/1984 | Lordo | 310/154 |

Primary Examiner—Donovan F. Duggan
Attorney, Agent, or Firm—Morgan, Finnegan, Pine, Foley & Lee

[57] ABSTRACT

A brushless DC tachometer including an alternator which produces a substantially trapezoidal output signal coupled to an FET transistor switching bridge. The trapezoidal output signal is achieved using a block permanent magnet for one pole and a consequent pole contoured to achieve a substantially uniform flux density for the winding over a distance sufficient to produce a trapezoidal output signal.

8 Claims, 5 Drawing Figures

FLUX CONTOURED ROTARY ELECTROMAGNETIC MACHINE

This invention relates to rotating electromagnetic machines and more particularly, to DC tahcometers with low ripple content in the output voltage. Although the invention is described primarily with regard to tachometers, the concept of the invention is also applicable to DC motors to provide low torque ripple content.

BACKGROUND OF THE INVENTION

A DC tachometer is usually in the form of a small DC generator which produces a potential proportional to speed. Normally the individual windings produce a sinusoidal signal as they pass through the magnetic field. The sinusoidal signals are then converted to a DC signal by means of the switching action of the commutator. Because of the sinusoidal shape of the individual windings and incremental switching action of the commutator, the output of the tachometer will include some undesirable ripple in the signal. In a typical DC tachometer the ripple content can be on the order of 6%. In higher quality tachometers which employ a larger number of commutator bars to reduce ripple content, the ripple content can be reduced to about 2%.

The concept of brushless DC motors is known. A suitable brushless tachometer design is disclosed in copending application entitled "Brushless Tachometer" by Phillip S. Coulon Jr. filed on even date herewith. The brushless DC tachometer is, in effect, an alternator coupled with solid state switching controlled in accordance with rotor position. In such devices, the ripple content of the output signal is a more severe problem since, due to practical considerations, the switching increments cannot be reduced significantly to reduce ripple content. Typically, a brushless DC tachometer would include a three-phase alternator and a six transistor switching bridge. With such an arrangement each switching increment would cover 60 electrical degrees of rotation and, if the windings produce sinusoidal signals, the tachometer output would include a large low frequency ripple component on the order of 13.5% of the output signal.

An object of this invention is to provide a brushless DC tachometer with a significantly reduced ripple content.

Another object is to provide a quality DC tachometer at reduced cost.

Still another object is to provide a low cost structure for a DC electromagnetic machine having a low ripple component.

SUMMARY OF THE INVENTION

The brushless DC tachometer according to the invention achieves reduced ripple content in the output signal by contouring the magnetic field flux. The magnetic field is intentionally nonuniform and contoured so that the signal produced by the individual windings is more nearly trapezoidal rather than sinusoidal. The switching interval during which the winding is connected to the output line coincides with the flat top of the trapezoidal waveform and, as a result, the ripple content in the output signal is substantially reduced.

The contoured magnetic field is achieved using an appropriately shaped consequent pole. One pole of the magnetic structure can conveniently be formed using a block magnet made of a high energy magnet material like alnico or samarium-cobalt. Such magnets are capable of producing a high flux density over a relatively large air gap. The other pole is formed by a shaped iron pole piece. The effect of the magnet and shaped consequent pole is to provide an approximately trapezoidal flux contour so that the winding passing through the magnetic field produces a generally trapezoidal waveform.

BRIEF DESCRIPTION OF THE DRAWINGS

The foregoing and other objects will become apparent from the following detailed specification which sets forth an illustrative embodiment of the invention. The drawings form part of this specification wherein.

DETAILED DESCRIPTION OF THE INVENTION

Figure 1:
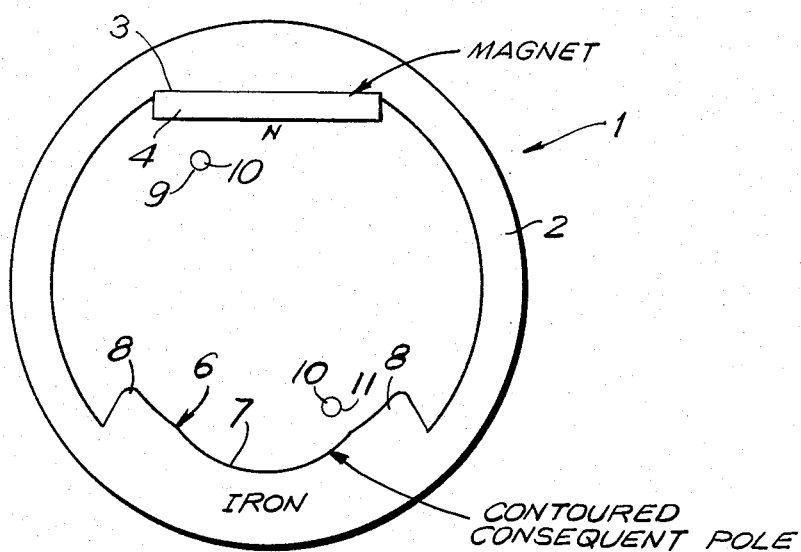
FIG. 1 is a cross sectional view showing the magnetic structure for the DC tachometer according to the invention.

A magnetic structure for achieving the contoured magnetic field according to the invention can be most easily illustrated as a stator structure as shown in FIG. 1. The Alternator 1 includes a generally cylindrical outer shell 2 preferably made of laminated iron. A flat surface 3 is provided on one side for mounting a block permanent magnet 4 and a contoured consequent pole 6 is provided on the opposite side.

Permanent magnet 4 could be of any known type but, because of the relatively large air gap in the structure, is preferably of a high energy type such as alnico or samarium-cobalt. The permanent magnet can be in a rectangular block form as shown to avoid difficult machining or shaping operations. The block pole face formed by the permanent magnet is not the ideal configuration for producing the desired waveshape, but can easily be compensated for by appropriate contouring of the consequent pole. The fact that a simple block permanent magnet can be used significantly reduces cost and simplifies construction.

The consequent pole is shaped so that the air gap is greatest at the center 7 and less toward the sides 8. The contour of the consequent pole is such that the combined flux density encountered by a winding due to the magnet pole and the consequent pole is substantially uniform for the period during which the winding is connected to the output line. Normally the winding will be connected to the output line from 60 degrees to 120 degrees and from 240 degrees to 300 degrees.

Figure 2A:
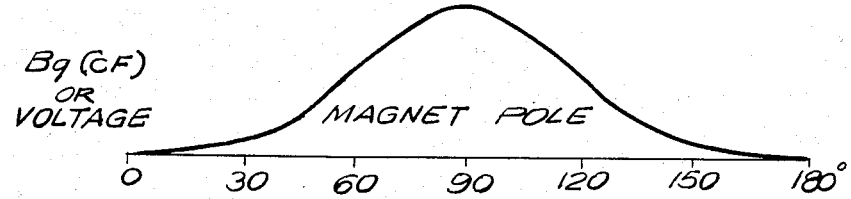
FIGS. 2A, 2B and 2C are diagrams illustrating, respectively, the magnetic contour of the magnet pole, the magnetic contour of the consequent pole, and the waveform of the signal generated in the winding.

FIG. 2A illustrates the flux density encountered by one side 9 of a coil 10 while passing the pole face of magnet 4. The flux density is greatest at the center (at 90 degrees) where the air gap is the least. Toward the ends of the magnet where increasingly larger air gaps are encountered, the flux density decreases. The flux density diminishes to zero at 0 degrees and 180 degrees.

Figure 2B:
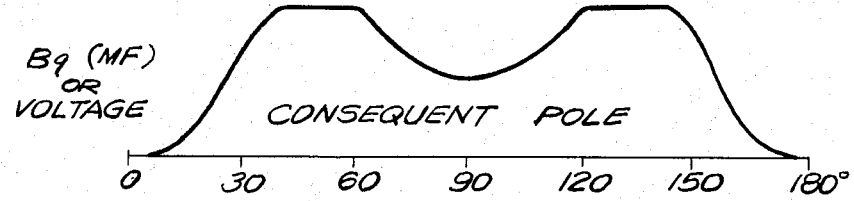

FIG. 2B illustrates the flux density encountered by the other side 11 of coil 10 while passing the consequent pole. In this case the minimum air gap is in the region of 30-60 degrees and 120-150 degrees resulting in a corresponding maximum flux density in these regions. Since the air gap is greater at the center of the pole, the flux density at 90 degrees is reduced.

Figure 2C:
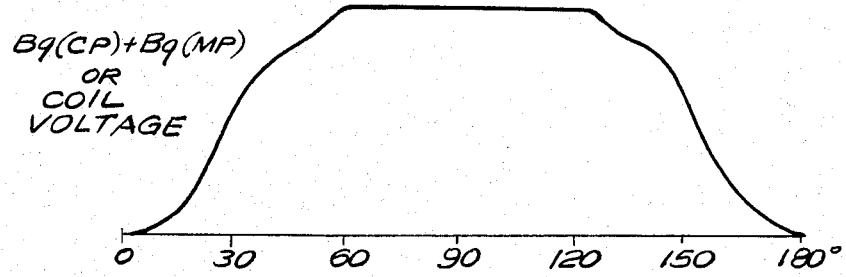

FIG. 2C illustrates the waveform generated in coil 24 as it passes through 180 degrees. The coil potential is the sum of the potentials generated by the two sides 26 and 28 of the coil and, hence, these potentials are in turn proportional to the respective flux densities. In other words, the potential generated in the coil at any particular point as shown in FIG. 2C is proportional to the sum of the flux densities in FIGS. 2A and 2B. The potential generated in the coil is substantially constant between 60 degrees and 120 degrees. The potential generated between 240 and 300 degrees would likewise be substantially constant, but of the opposite polarity.

Although the magnetic circuit is illustrated as a stator structure in FIG. 1 in combination with rotating windings, the prefered structure would be the inside-out version thereof with a rotating permanent magnet and a stationary winding so as to avoid moving contacts for the winding.

Figure 3:
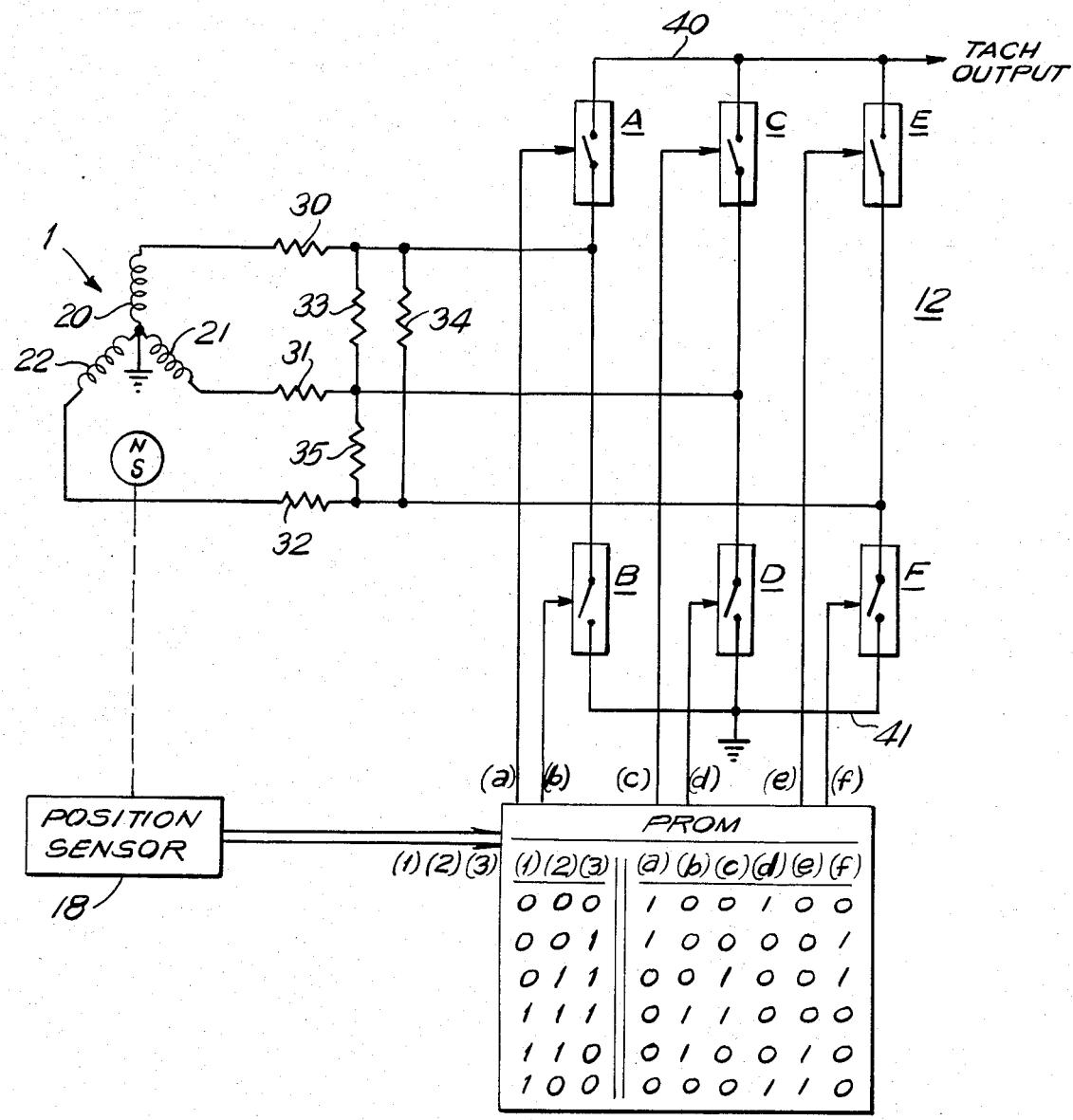
FIG. 3 is a schematic diagram illustrating switching circuits for the tachometer according to the invention.

FIG. 3 is a schematic diagram illustrating a suitable switching circuit for the tachometer according to the invention. The tachometer system includes alternator 1 (as shown in FIG. 1) coupled to a six transistor switching bridge 12 via a voltage divider network 14. The switching logic is provided by a programmable read only memory (PROM) 16 addressed by a rotor position sensor 18.

More particularly, the alternator includes stator windings 20-22 connected in a three-phase, grounded neutral, wye configuration. A grounded neutral winding configuration provides lower ripple content than delta windings or non grounded wye windings. The Rotor is mechanically coupled to position sensor 18 which can be a conventional array of Hall sensors arranged to provide a six position indication in three digit code. Other types of position sensors can also be used such as optical or magnetic encoders.

The three digit position code from position sensor 18 is supplied as the address input, (1), (2) and (3), to a 3×6 PROM 16. The logic table stored in PROM 16 is shown in FIG. 1. For example, if the input address from the position sensor is "000", as in the top line of the table, the digital word "100100" appears on the six output lines (a) to (f) meaning that lines (a) and (d) are high ("1") and that the remaining lines are low ("0").

Resistors 30-35 make up the three phase voltage divider network. Resistors 30-32 are connected in series in the lines between the windings of alternator 1 and the switches of switching bridge circuit 12. Resistors 33-35 are connected between the three-phase lines. The resistance values are selected to reduce the alternator output voltages to values within the range that can be handled by the switching transistors.

Transistor bridge 12 is made up of field effect transistors (FET's) such as RCA CD 4066B which are CMOS (complementary metal oxide semiconductor) bilateral switches. These transistors are available at modest cost and have adequate capacity for most tachometer applications. The peak controllable voltage is in the range beteween +8 volts and −8 volts. The free end of winding 20 is connected to switches A and B in bridge circuit 12 via resistor 30, whereas the free end of winding 21 is connected to switches C and D via resistor 31 and the free end of winding 22 is connected to switches E and F via resistor 32. Output lines (a) to (f) from PROM 16 are connected to control the conductive states of transistor switches A to F, respectively. Switches B, D and F are connected to a common ground connection 41 whereas switches A, C and E are connected to a common tachometer output line 40.

In operation, the position sensor and PROM 16 render the switches conductive in pairs according to rotor position to provide a DC signal with a value and polarity proportional to the rotor speed and direction. It is significant that FET's are used in the switching bridge since these transistors do not have a threshold offset as is the case with the normal transistor. As a result, the output voltage is proportional to speed throughout the range of operation and particularly in the range near zero.

Other circuit arrangements suitable for use with the magnetic structure according to this invention are also described in said co-pending application.

Although only one embodiment has been described in detail, it should be obvious that there are other variations within the scope of this invention. The invention is more particularily defined in the appended claims.

I claim:

1. In a rotary electromagnetic machine, the combination of
   a magnetic structure including
      at least two poles,
      a block permanent magnet providing one of said poles, with a nonuniform gap spacing, and
      wherein the other one of said poles is a consequent pole structure; and at least one coil moving relative to said poles;
   said consequent pole being contoured to provide a nonuniform gap spacing relative to said moving coil so that the sum of the flux densities encountered by said coil moving relative to said consequent pole and the other of said poles is substantially constant for portions of each revolution.

2. The rotary electromagnetic machine according to claim 1 wherein said coil is energized and said machine operates as a motor.

3. The rotary electromagnetic machine according to claim 1 wherein said coil generates a signal and operates as a tachometer.

4. A rotary electromagnetic machine according to claim 1 wherein said sum of the flux densities encountered by said coil are substantially constant between 60 and 120 degrees and between 240-300 degrees.

5. A brushless DC tachometer of the type including an alternator for generating an alternating signal proportional to speed, a rotor position sensor, and a solid state switching circuit for producing a DC output signal proportional to speed from said alternating signal, the improvement compromising:
   said alternator having a magnetic structure including
      at least two poles, one of which is a consequent pole, and
      the other of which is provided by a permanent magnet pole surface with a nonuniform gap spacing;
   said alternator further including at least one coil movable relative to said poles to generate the alternating signal; and said consequent pole being contoured to provide a nonuniform gap spacing relative to said movable coil so that the sum of the flux densities encountered by said coil moving relative to said poles is substantially constant for at least intervals during which said coil is connected by said switching circuit for contributing to said DC output signal.

6. A brushless DC tachometer according to claim 5 wherein said permanent magnet is a high energy block magnet forming one of said poles.

7. A brushless DC tachometer according to claim 5 wherein said sum of the flux densities encountered by said coil are substantially constant from 60–120 degrees and from 240–300 degrees.

8. A brushless DC tachometer according to claim 5 wherein said alternator includes a grounded neutral, three phase, wye winding which includes said coil.

* * * * *